Oct. 28, 1947.  A. I. WEISS  2,429,783
FAUCET
Filed March 3, 1945

Inventor
Abraham I. Weiss
by Roberts Cushman Cramer
Att'ys.

Patented Oct. 28, 1947

2,429,783

UNITED STATES PATENT OFFICE 2,429,783

FAUCET

Abraham I. Weiss, Brookline, Mass.

Application March 3, 1945, Serial No. 580,870

5 Claims. (Cl. 251—44)

This invention relates to valves, more especially to faucets or taps. Customarily a faucet has an annular plane seat defining the control orifice through which the fluid flows. The valve spindle has a rigid disk or head at its lower end, of a diameter at least as great as that of the orifice, and usually provided with a downwardly directed marginal flange or wall defining a shallow chamber for the reception of a flat somewhat resilient washer, designed to engage the seat and to form a leak-tight closure. Commonly the head has an axial screw-threaded bore for the reception of a screw whose head bears against the lower surface of the washer to hold the latter in place. The screw head as thus arranged is exposed to the pressure fluid, whether the faucet be opened or closed, and even though made of copper or copper alloy gradually deteriorates and loses strength. Thus, when replacing a worn washer, the screw head may crack or the shank of the screw may break off in the threaded bore, necessitating the use of a drill or similar tool for removing it. Furthermore, since the diameter of the valve head differs with different makes of faucet, it is necessary for the plumber or other person who may be called upon frequently to repair leaky faucets, to keep on hand a great number of sizes of washer.

The usual plane seat with which the washer contacts is subject to erosion, so that after a certain period of use even a new washer may not suffice to stop leakage and under these conditions it is necessary to reface the seat, an operation which requires skill and special tools.

Principal objects of the present invention are to provide a novel valve head construction including a seat-engaging element applicable to old or new faucets and whose use avoids most of the difficulties inherent in prior constructions, in particular to provide a seat-engaging element which may be held in properly assembled relation with the other parts without the usual retaining screw, and which may be installed or removed very easily and without the use of tools. A further object is to provide a seat-engaging element which will not rotate relatively to the head when the valve spindle is turned, and which, if desired, may be held against axial movement relatively to the valve head by means which is exposed to the fluid only when the valve is open. A further object is to provide a seat and seat-engaging element of such configuration as to prolong the period during which the faucet will remain leak-tight without requiring replacement of the washer element or refacing of the seat.

Other and further objects and advantages of the invention will be pointed out in the following more detailed description and by reference to the accompanying drawings, wherein Fig. 1 is a side elevation, partly in vertical section, of a faucet of generally conventional type but embodying the present invention;

Figure 1:
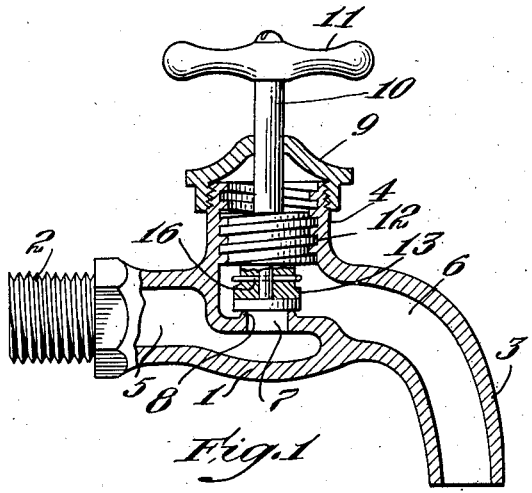

Referring to the drawings, the numeral 1 designates a faucet of more or less conventional type having the screw-threaded attaching nipple portion 2, the delivery spout portion 3, the externally and internally screw-threaded bonnet portion 4, the inlet chamber 5, the delivery chamber 6, and the orifice 7 through which the fluid passes from the chamber 5 to the chamber 6 and which is defined by the plane annular valve seat 8. A removable cap 9, having threaded engagement with the external screw threads on the bonnet portion 4 of the faucet, forms a guide for the valve spindle 10 having the handle 11 at its upper end, and having the externally screw-threaded plug portion 12 which engages the internal threads of the bonnet 4. Integral with or rigidly attached to the plug portion 12 and coaxial with the latter, is the valve head 13 having a flat lower or abutment surface and having an axial bore. While as here illustrated the head 13 is unprovided with the usual downwardly directed marginal flange, it is to be understood that the present invention is applicable to valve heads of the type in which such a flange is employed.

Figure 3:
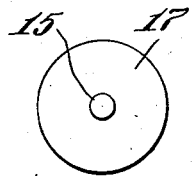
Fig. 3 is a top plan view of the seat-engaging element of Fig. 2.
Figure 2:
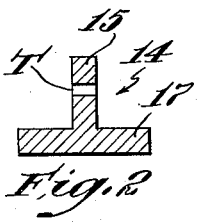
Fig. 2 is a diametrical section through a seat-engaging element embodying the present invention.

In accordance with the present invention, and as particularly illustrated in Figs. 1, 2 and 3, there is provided a removable seat-engaging element 14 comprising a stem 15 which is received in the axial bore in the valve head 13, and the disk-like part 17 which contacts the valve seat. Preferably the stem 15 is provided with a transverse hole or aperture T and the head 13 of the valve is provided with a corresponding diametrical opening through which may be passed a pin 16 or other retaining element for holding the stem 15 of the seat-engaging element against rotative and axial movement relatively to the valve head. The pin 16 may be of any suitable type such as may readily be inserted and removed, and not only prevents the stem 15 from moving axially but also prevents the part 17 from rotating relatively to the valve head. The part 14, as illustrated in Figs. 2 and 3, is of unitary construction and made of some suitable resilient organic material, for example rubber, a rubber compound, artificial rubber, indurated fiber, or one of the synthetic resins, the part 17 being designed to form a leak-tight contact with the seat 8 when the faucet is closed.

To assemble this part 14 with the valve head, it is merely necessary to unscrew the cap 9, withdraw the valve spindle and head from the faucet, push the stem 15 of the member 14 up into the axial bore in the valve head, insert the pin 16, and then restore the head and the cap 9 to normal position. No tools are necessary in performing this operation and since the pin is only exposed to the fluid during the comparatively short period that the faucet is open, there is little danger of such corrosion of the pin 16 as will cause it to fail to perform its function. Even if this pin does corrode after a long period of use, it is easy enough to remove it merely by pushing it out, for example in introducing a similar new pin. With this arrangement repair of the faucet to prevent leakage is a very simple matter, and is not complicated by the possible deterioration of retaining elements.

Figure 5:
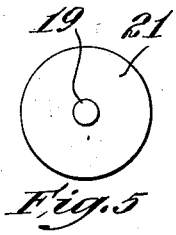
Fig. 5 is a plan view of the device shown in Fig. 4.
Figure 4:
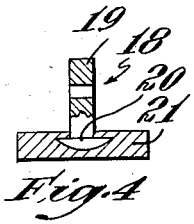
Fig. 4 is a view generally similar to Fig. 2 but illustrating a slight modification.

In Figs. 4 and 5 a slight modification of the seat-engaging element is shown at 18. In this instance the stem portion 19 may be of a different material from the seat-engaging disk portion 21— for instance the part 19 may be of metal and may have a head 20 at its lower end which is embedded in the part 21, for example when the latter is moulded to shape. Such an arrangement permits the use of different materials for the parts 19 and 21, which may be advantageous, particularly when it is desired to employ a very soft and resilient material for contact with the valve seat.

Figure 6:
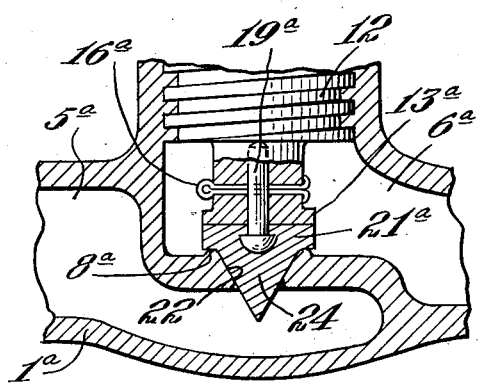
Fig. 6 is a fragmentary vertical section through a faucet generally similar to that of Fig. 1, but to somewhat larger scale, showing a seat of modified construction and a seat-engaging element embodying the present invention but somewhat different from that illustrated in Fig. 1.
Figure 7:
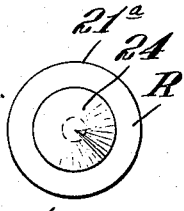
Fig. 7 is a bottom view of the seat-engaging element shown in Fig. 6.

In Figs. 6 and 7 a further modification is illustrated, the faucet 1a having the inlet chamber 5a and the delivery chamber 6a, but having an orifice between these chambers whose upper end is defined by the plane annular seat 8a similar to the seat 8 above described, but which also comprises a downwardly tapering portion defined by the conically sloping valve seat surface 22. For use with this composite seat there is provided a seat-engaging element comprising the disk-like part 21a corresponding in general to the parts 17 and 21 above described, and having the stem 19a which is received in an axial bore in the valve head 13a, and which is removably secured in position by the removable pin 16a. In this instance, however, the disk-like part 21a is provided with a conical downward extension or boss 24. The base of this boss is of a diameter less than that of the part 21a so that a marginal portion R of the under surface of the latter is left exposed for contact with the seat 8a. Normally, when first installed, the part 21a will engage the seat 8a, when the faucet is closed. If desired the boss 24 may be so dimensioned that when the parts are new it will not actually contact the seat surface 22. However, as the part 21a becomes worn in use, so that the valve spindle must be pushed further down to close the faucet, the conical portion 24 may eventually be brought into contact with the seat surface 22, thus affording further leak-tight operation of the faucet for a very substantial period before it becomes necessary to replace the seat-engaging device.

Figure 9:
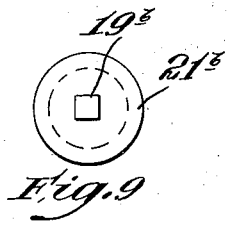
Fig. 9 is a plan view of the seat-engaging element of Fig. 8.
Figure 8:
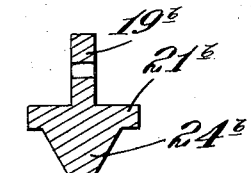
Fig. 8 is a diametrical section through a seat-engaging element, generally similar to that of Figs. 6 and 7, but with a slight modification.

In Figs. 8 and 9 a modification of the arrangement shown in Figs. 6 and 7 is illustrated, wherein the stem 19b is integral with the parts 21b and 24b, the stem 19b being of polygonal (specifically square) transverse section. With such an arrangement the bore in the valve head will be of a corresponding polygonal section so that when the stem 19b is inserted in the bore the seat-engaging element will be held against rotation relatively to the valve head without necessitating the provision of a retaining pin. For most purposes the pressure of the fluid acting against the under side of the seat-engaging element is sufficient to prevent the latter from moving axially of the valve head and thus with such an arrangement as that shown in Figs. 8 and 9, the seat-engaging element may be introduced and removed simply by pushing the stem 19b into the bore in the head or withdrawing it therefrom. However, a retaining pin may be used.

Figure 10:
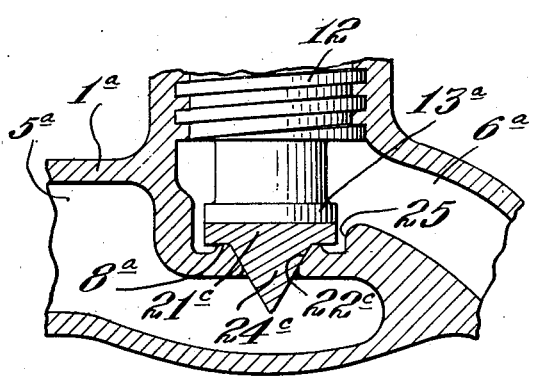
Fig. 10 is a view generally similar to Fig. 6, but illustrating a seat-engaging element of a further modified form.

In Fig. 10 a further modification is illustrated, the faucet 1a having the inlet chamber 5a and the delivery chamber 6a, and having a composite seat including the parts 8a and 22c, similar to the arrangement of Fig. 6. In this construction the seat-engaging element comprises the disk-like part 21c, whose marginal portion engages the seat 8a and whose central downwardly directed conical portion 24c may engage the conical seat surface 22c. However, in this instance the seat-engaging device has no stem at all, its upper surface being flat and designed to contact the under surface of the head 13a. It may be preferred, when using this type of construction, to provide the faucet with an upstanding annular wall 25 of a diameter somewhat greater than that of the seat 8a to confine the loose seat-engaging element. In installing the seat-engaging element, the valve head is withdrawn from the faucet, the seat-engaging element is dropped into the valve orifice, and the valve head restored to position. When the valve head is retracted to open the faucet, the seat-engaging element merely floats up on the stream which passes through the orifice, being restrained against lateral movement by the conical portion 24c and by the wall 25, if the latter be provided. The conical boss 24c acts as a centering means to bring the seat-engaging element back to proper position as the faucet is closed. It is assumed that the head will not be raised sufficiently to prevent the seat-engaging element from escaping entirely from the orifice. This arrangement represents the very simplest form of construction, since the seat-engaging element has no attaching means whatsoever. However, for most purposes it is preferred to provide the seat-engaging element with a stem in order to keep it centrally located with reference to the orifice and to prevent chatter.

I claim:

1. A faucet comprising a fluid flow orifice having a conical seat surface divergent in the direction of flow and terminating at an annular plane seat surface, an axially movable valve head having an axial bore and a substantially flat surface opposed to the annular seat surface, and a seat-engaging device of relatively soft, resilient, organic material comprising a disk-like portion having a substantially flat surface for contact with the flat surface of the valve head, a marginal surface for contact with the annular seat surface, a conical boss for contact with the conical seat surface, said boss being made of the same material as, and integral and coaxial with, the disk-like element, and a stem coaxial with the disk-like element and projecting from the face thereof, said stem being disposed within the axial bore of the head whereby relative axial movement of the valve head and the stem is prevented.

2. The combination of claim 1 wherein the bore and the stem are circular in cross section, the stem is made of the same material as, and is integral with, the disk-like element, and the stem frictionally engages a portion of the bore whereby relative axial movement of the valve head and the stem is prevented.

3. The combination of claim 1 wherein the bore and the stem are of non-circular cross section, the stem is made of the same material as, and is integral with, the disk-like element, and portions of the stem engage portions of the bore whereby relative axial movement of the valve head and the stem is prevented.

4. The combination of claim 1 wherein the material of the stem is more rigid than the disk-like element, the stem and the valve head are provided with registering transversely extending openings, and a removable retaining element extends into said transverse openings in the head and stem whereby relative axial movement of the valve head and the stem is prevented.

5. The combination of claim 1 wherein the stem is made of the same material as, and is integral with, the disk-like element, the stem and the valve head are provided with registering transversely extending openings, and a removable retaining element extends into said transverse openings in the head and stem whereby relative axial movement of the valve head and the stem is prevented.

ABRAHAM I. WEISS.

REFERENCES CITED

The following references are of record in the file of this patent:

UNITED STATES PATENTS

| Number | Name | Date |
| --- | --- | --- |
| 706,573 | Lindsay | Aug. 12, 1902 |
| 1,020,374 | Simmons | Mar. 12, 1912 |
| 1,419,290 | Monahan | June 13, 1922 |
| 1,681,845 | Dilley | Aug. 21, 1928 |
| 1,799,667 | Ziegler | Apr. 7, 1931 |
| 2,081,616 | Diamond | May 25, 1937 |
| 2,194,960 | Walker | Mar. 26, 1940 |
| 2,194,961 | Walker | Mar. 26, 1940 |
| 2,364,107 | Svirsky | Dec. 5, 1944 |

FOREIGN PATENTS

| Number | Country | Date |
| --- | --- | --- |
| 25,286 | Australia | 1935 |
| 550,734 | Great Britain | 1943 |